United States Patent [19]

Harding, deceased et al.

[11] 3,807,095
[45] Apr. 30, 1974

[54] ROCK SAW
[76] Inventors: Asa C. Harding, deceased, late of Winfield, Kans.; Ella M. Fry, administratrix, 3601 E. Funston, Wichita, Kans. 67218
[22] Filed: Mar. 13, 1972
[21] Appl. No.: 234,128

[52] U.S. Cl............................ 125/13 SS, 125/35
[51] Int. Cl.......................... B28d 1/04, B28d 7/04
[58] Field of Search .......... 125/12, 13 R, 13 SS, 16, 125/35; 51/91, 93, 9 S; 83/411 R, 412, 437, 425, 433; 269/55, 56, 51, 61, 71, 73; 33/78

[56] References Cited
UNITED STATES PATENTS

| | | | |
|---|---|---|---|
| 2,320,743 | 6/1943 | Nizsen | 125/13 SS |
| 2,399,239 | 4/1946 | Martin | 125/13 SS |
| 2,413,795 | 1/1947 | Speed | 125/14 |
| 2,450,371 | 9/1948 | Coates | 125/13 R |
| 2,998,813 | 9/1961 | Wilson | 125/13 SS |
| 3,166,361 | 1/1965 | Panzer et al. | 269/55 X |
| 1,406,477 | 2/1922 | Morrill | 125/35 |

*Primary Examiner*—Harold D. Whitehead
*Assistant Examiner*—Nicholas P. Godici
*Attorney, Agent, or Firm*—John H. Widdowson

[57] ABSTRACT

A saw structure has a frame with a table translatable into a blade and movable transverse the blade. An upper carriage is rotatable relative the blade. The blade is supported on an arm to overhang the carriage. The saw structure cuts rocks and stones with precision.

5 Claims, 10 Drawing Figures

ROCK SAW

Numerous types of saws are known in the prior art as operable to cut rocks, stones and the like. However these prior art devices generally have no means to precisely turn the stone on a supporting surface to align it with the cutting blade; also these prior art devices generally do not have an angularly adjustable blade which enables the saw to cut angular surfaces relative to the supporting surface. Other prior art devices are primarily adaptations of conventional wood cutting table saws which are normally used for cutting wood and which are fitted with stone cutting blades. Other types of prior art devices are primarily radial arm type saws such as are commonly used for cutting wood and which are fitted with stone cutting blades and used for cutting stones and the like.

In one preferred specific embodiment, the saw structure of this invention includes a frame table like structure on which a carriage apparatus is mounted to move freely and longitudinally therealong toward the opposite end at which the rotatable blade apparatus is supported with a rotatable blade that can be raised and lowered relative to the carriage apparatus and angularly rotated. The frame structure has the basic appearance of an elongated rectangular table, the top portion of which has elongated rails thereon on which the carriage apparatus is mounted.

At the forward end of the table-frame, and at the rear portion thereof a pair of upright members on the sides of the structure support therebetween a swinging pivotable arm on which the rotatable blade is mounted. The carriage apparatus has a lower carriage mounted with the frame structure that is adapted to easily move from the forward end portion of the table-frame to the rear end portion of the table-frame by hand motion and an upper carriage precisely movable transverse relative to the table-frame and lower carriage; and still, a rotatable carriage mounted above the upper carriage which is precisely rotatable and on which a stone or the like is placed for cutting. The cutting blade support apparatus has a transverse member between the rear upright frame members on which a swinging arm is mounted so that it can be precisely rotated and, raised and lowered relative to the rotatable carriage. The swinging arm rotates to position the cutting blade angularly relative to the work piece carriage. A cutting blade cooling apparatus is provided which has a liquid coolant injector mounted on a shield that partially covers the cutting blade, a pump to circulate cooling liquid and a basin mounted with the frame structure immediately below the elongated rails on which the carriage apparatus moves. A dust removal apparatus is provided on the rear portion of the frame structure and attached to the swinging arm so as to move with it and collect dust from the cutting blade in a conduit inlet, pull it through a blower and discharge it behind the saw structure.

One object of this invention is to provide a saw structure overcoming the aforementioned disadvantages of the prior art devices.

Still, one other object of this invention is to provide a saw structure having a carriage apparatus which can be precisely adjustable so as to move a work piece transverse to the normal cutting direction of the blade and rotate the work piece on the carriage apparatus in a precise manner so that when the carriage apparatus and work piece are moved into the cutting blade the cut can be controlled accurately in position, depth and direction.

Still, one another object of this invention is to provide a saw structure which has a rotatable cutting blade supported on a swinging arm that can be precisely rotated in angular position relative to a work piece holding carriage which is moved into the blade.

Still, one other object of this invention is to provide a saw structure adapted for the precise cutting of rocks, stones and the like which has a carriage apparatus on which a work piece can be moved into a cutting blade and on which the work piece can be precisely and accurately moved transverse relative to the cutting blade and rotated relative to the cutting blade; and a saw structure which has a cutting blade that can be raised and lowered relative to the carriage apparatus and turned in angular position relative to the carriage apparatus.

Still, another object of this invention is to provide a saw structure which is adapted for the precise cutting of rocks and stones that has a carriage apparatus on which a stone can be placed and moved into the cutting blade in a precise manner, a cutting blade supported on a swinging arm that can be angularly rotated in a precise manner relative to the work piece, and also having a cutting blade cooling apparatus adapted to cool the blade during the cutting operation, and a dust removal apparatus adapted to remove dust from the cutting area during the cutting operation.

Various other objects, advantages, and features of the invention will become apparent to those skilled in the art from the following discussion, taken in conjunction with the accompanying drawings, in which:

The following is a discussion and description of preferred specific embodiments of the saw structure of this invention, such being made with reference to the drawings, whereupon the same reference numerals are used to indicate the same or similar parts and/or structure. It is to be understood that such discussion and description is not to unduly limit the scope of the invention.

Figure 1:
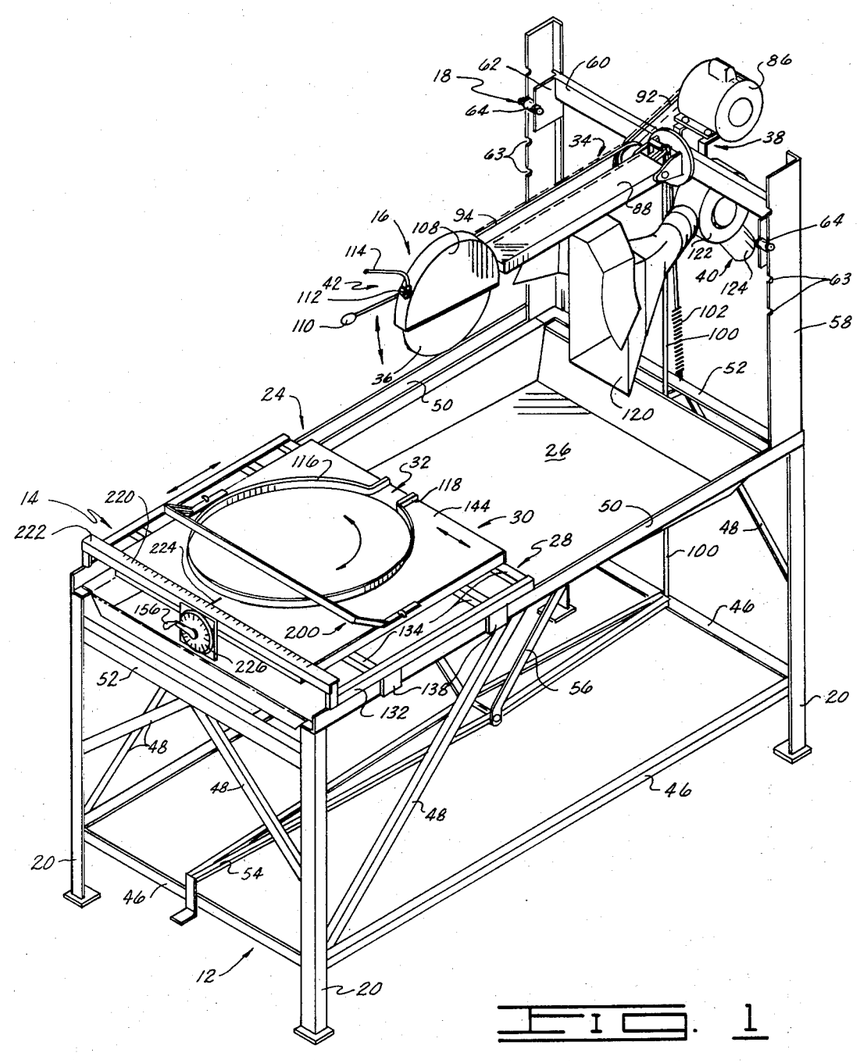
FIG. 1 is a perspective view of the saw structure taken from the carriage end and above, with arrows thereon indicating the direction of motion of the various movable elements.

Referring to the drawings in detail and in particular to FIG. 1, the saw structure of this invention, indicated generally at 10 is shown in a perspective view with the apparatus prepared for use. The rock saw structure 10 includes a table like frame structure 12 supporting the carriage apparatus 14 on its upper portion and having the cutting blade apparatus 16 supported from upright structural members indicated at 18 on the rear portion of the frame structure. The table-frame structure 12 has legs 20 to support the carriage apparatus 14 and cutting blade apparatus 16 on its upper portion. A basin 26 is secured to the frame structure between the sides thereof and extending under the carriage apparatus pathway.

The carriage apparatus 14 includes a lower carriage indicated at 28 mounted on the frame structure so as to be movable, an upper carriage 30 mounted on the lower carriage 28, and another carriage 32 mounted on the upper carriage and adapted to be rotated. The lower carriage 28 is connected to the upper carriage 30 by a gear drive means enabling the upper carriage 30 to be precisely moved relative to the lower carriage 28. Similarly, the work piece carriage 32 is mounted on the upper carriage 30 so as to be precisely rotatable relative to the upper carriage. The cutting blade apparatus 16 includes the swinging arm apparatus 34 and a rotatable cutting blade 36. The swinging arm apparatus 34 is mounted so as to pivot raising and lowering the cutting blade 36 relative to the carriage apparatus 14. The swinging arm structure is also mounted with the support structure 18 to be turned angularly relative to the carriage apparatus, the angular mount for the swinging arm apparatus is generally indicated at 38. The cutting blade apparatus 16 also includes a dust removal device, indicated at 40, and a blade cooling device, generally indicated at 42.

In general operation the rock saw structure 10 of this invention, is adapted to have a rock or large stone placed on the rotatable work piece carriage 32 and precisely adjusted in rotational position and transverse position by the combination of the rotatable carriage 32 and the upper carriage 30 then moved toward the rear portion of the saw structure and simultaneously passing the stone through the cutting blade 36. The cutting blade 36 can be additionally adjusted in its vertical position to determine the depth of the cut made and it can be turned so the cutting blade arbor is in an angular position relative to the upper surface of the rotatable carriage 32.

Figure 6:
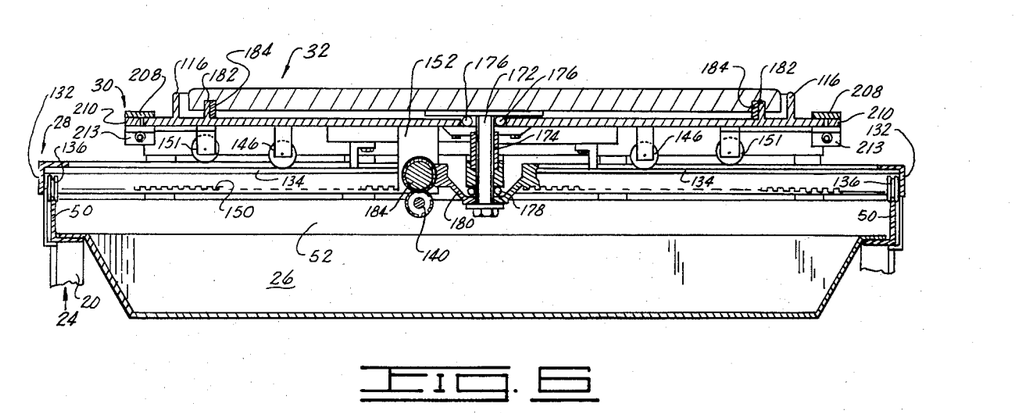
FIG. 6 is a cross sectional view of the carriage apparatus taken through its center portion transverse to the frame structure, taken on line 6—6 of FIG. 2.

The table like frame structure 12 is an elongated rectangular structure having legs 20 at its four corners and connected on the lower portion by rectangular braces 46 around the periphery; it has additional braces 48 extending from the legs upward to the carriage support structure portion 24 of the frame on its upper portion. The carriage support structure is a pair of elongated rail members indicated at 50 running the length of the longer side on which the carriage apparatus 14 is mounted. On the upper ends of the frame structure transverse members 52 connect the legs 20 joined by additional bracing members 48. Overall, the table-frame structure 12 is constructed sufficiently strong so that stones of a relatively large size and weight can be safely used with the rock saw 10. The basin 26 is supported below the rail members 50 as can be seen in FIG. 6 and in FIG. 1, it extends below the upmost portion of the frame structure and substantially covers the top area portion of the frame structure so as to enable cooling liquid to be caught regardless of the longitudinal position of the carriage apparatus. A foot operated fulcrum indicated at 54 is supported from the frame structure on vertically dependent pivot members 56 and is used to move the swinging arm apparatus 34 as will be described in detail hereinafter. The rear portion of the frame structure is the mount for the upright support structure 18.

Figure 10:
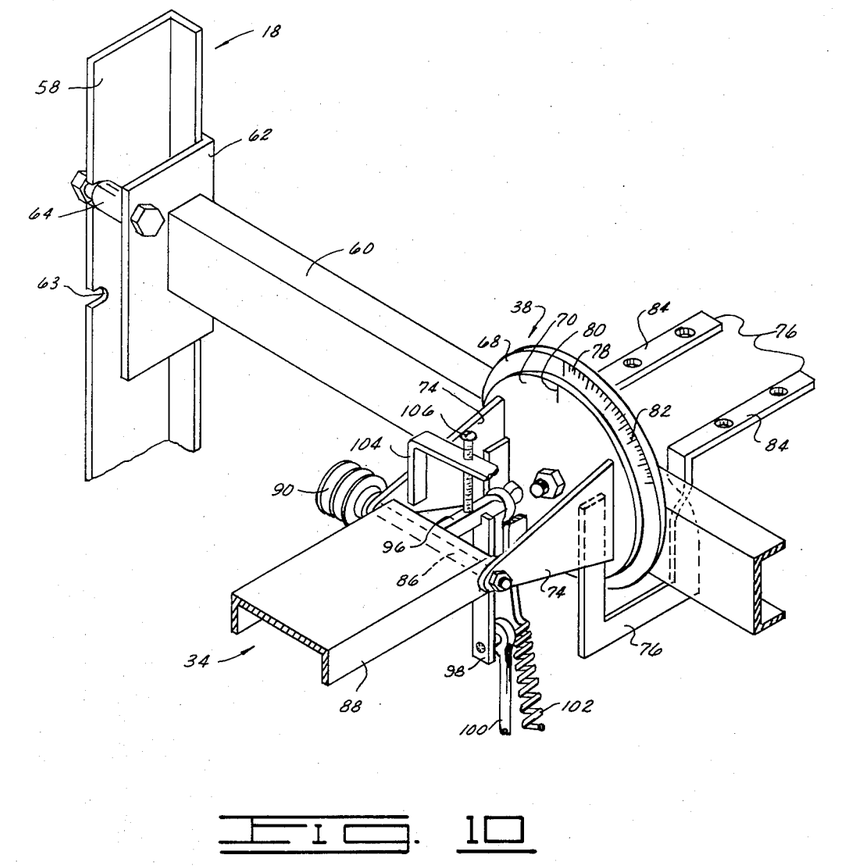
FIG. 10 is an enlarged perspective view of the swinging blade support arm structure and pivot mount apparatus cut away from the adjoining structure.

The upright support structure 18 includes a pair of swinging arm support standards 58 extending upward at the rearmost end portion of the frame structure with a transverse support member 60 mounted therebetween on which the swinging arm apparatus 34 is mounted. The transverse support member 60 has end plates 62 engaged with the upright standards 58 which are adjustable in vertical position on the upright standards. Vertical adjustment of the transverse support member 60 is accomplished by the use of notches 63 in the forward side of the upright standards used to engage the position adjusting bolts 64. An upright standard 58 and a portion of the swinging arm apparatus 16 is shown in FIG. 10. A plurality of notches 63 are provided in each upright standard so that vertical adjustment of the swinging arm apparatus 16 can be done in order to allow the rock saw to be used with both large and small stones. The angular mount portion of the swinging arm apparatus indicated at 38 includes a fixed plate 68 secured to a transverse support member 60, a rotatable plate 70 mounted with the fixed plate by a pivot bolt 72. A pair of swinging arm pivot plates 74 are integrally attached to the rotatable plate 70, and a motor mount structure indicated at 76. The fixed plate 68 is provided with indicia indicated at 76 used in combination with another indicia marked 80 to set the angular position of the swinging arm apparatus. Preferably the indicia scale 76 has an angular marking scale so the precise angle in degrees from the vertical of the cutting blade 36 can be set and determined.

On the swinging arm mount the motor mounts 76 consist of a pair of like members having U-shaped members one end of which is attached to the arm pivot plates 74. The motor mount portion of the swinging arm mount assembly 38 is shown in FIGS. 10 and 1. The motor mount has a pair of like similarly shaped members each one of which is attached to the arm pivot plate 74 and has a U-shaped portion passing well below the transverse support member 60 with a horizontal motor mount portion 84 behind the transverse support member 60. The relative positions of the motor mounts and other structure is shown clearly in FIG. 1 where a motor 86 is mounted on a motor mount 76. The motor 86 is preferably electrical and has a switch control. The motor mount 76 is constructed so that rotating movement of the swinging arm apparatus 34 can be turned and at the same time not interfere with the rotating operation of the cutting blade.

On the forward end portion of the swinging arm mount 38 and arm pivot bolt 86 is provided to connect the swinging arm 88 to the arm pivot plate 74. The two grooved pulley 90 is attached to one end of the arm pivot bolt 86 and is used as an intermediate jack shaft for the cutting blade belt drive. The cutting blade 36 is mounted on an arbor and driven by one belt 92 connecting the motor 86 to the intermediate pulley 90 and a second belt 94 connecting the intermediate pulley 92 to another pulley mounted on the cutting blade arbor, (not visible in the drawings). The intermediate pulley 90 is mounted with the arm pivot bolt 86 so that it will freely rotate relative to the bolt.

The swinging arm 88 is an enlongted beam like member and is sufficiently strong to support the cutting blade during the cutting operation without turning or twisting of the cutting blade substantially. The swinging arm 88 is mounted with the saw structure so as to be freely pivotable vertically and it is balanced by a spring so when the blade end of the arm is unweighted the arm will move to a raised position safely away from the working area, and it can be easily pulled down into position by hand or by use of the foot control. The rear portion of the swinging arm 88 behind the arm pivot bolt 86 has a control arm 96 extending rearwardly therefrom as shown in FIG. 10. The control arm 96 has an extension 98 integrally attached thereto and extending downwardly therefrom. The control arm extension 98 is connected to a tie rod 100 which is connected to the foot operated lever 54 and used to rotate the swinging arm by foot pressure. A control spring 102 is connected to the rearward most end portion of the control arm 96 and connected to the frame structure on its other end. The control spring 102 is preferably adjustable in tension so that the entire cutting blade apparatus 16 can be relatively balanced as described. Above the control arm 96 a stop is provided to limit the downward movement of the swinging arm 88. The control arm stop consists of a stop support bracket 104 and an adjustable locking bolt 106. Adjustment of the locking bolt 106 up and down in the stop bolt support 104 provides an adjustment of the lower most position to which the cutting blade will move. This adjustment is preferred in order to compensate for wear of the cutting blade 36 and to provide a height adjusting feature. On the blade end of the swinging arm 88 a shield 108 is provided enclosing a major portion of the cutting blade 36 and a handle 110 is provided for hand pivoting of the swinging arm apparatus 34.

Figure 2:
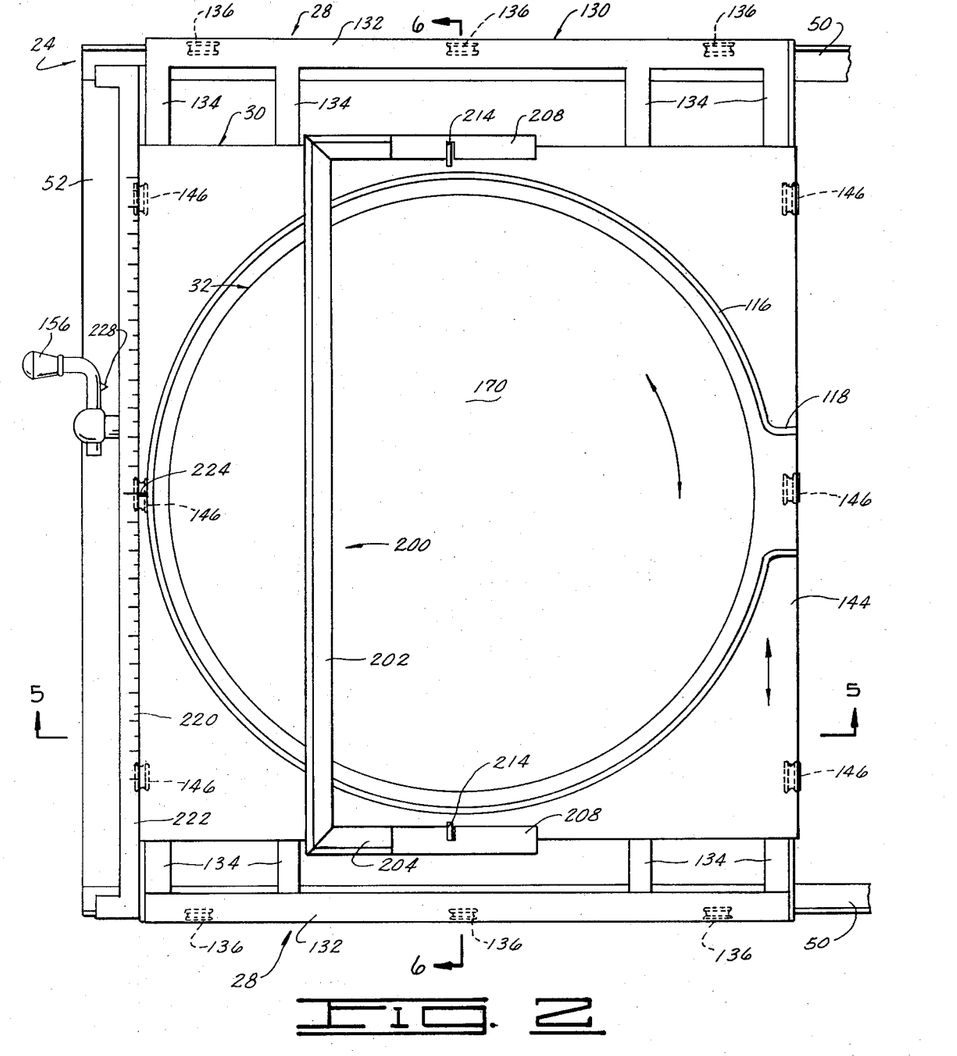
FIG. 2 is a top plan view of the carriage end portion of the saw structure showing the carriage apparatus and having double headed arrows indicating the direction of motion for the separate portions of the carriage apparatus.
Figure 3:
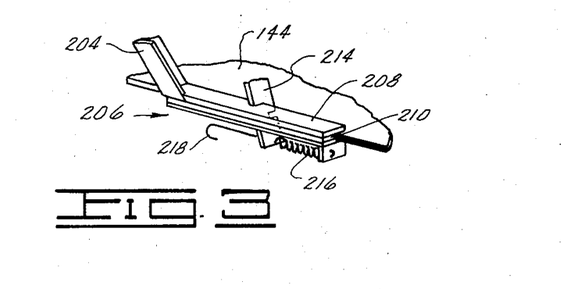
FIG. 3 is a reduced size perspective view of the carriage fence lock apparatus.

The blade cooling apparatus 42 is connected to the cutting blade shield 108 and is used to pass cooling liquid onto the cutting blade 36. The blade cooling apparatus has a controllable injector valve 112 mounted on the shield 108 on its forward portion as indicated in FIG. 1. The injector valve 112 is fed liquid through a conduit 114 from a pump, (the pump is not shown in the drawings). The basin 26 below the carriage apparatus 14 is adapted to collect the cooling liquid and it is provided with a return drain to the pump for recirculation of the liquid. The pump is adapted to be independently controlled from the drive motor 86 so the cooling fluid can be run on the cutting blade 36 whether or not the motor 86 is operating. The injector valve 112 is used to control the amount of fluid which is directed onto the cutting blade 36. In practice the use of a cooling liquid in a cutting process is found to be advantageous to cool the blade when sawing hard materials such as tile. A waste liquid collection trough 116 is provided surrounding the rotatable work piece carriage 32 with an outlet 118 to discharge the collected liquid from the rear of the carriage apparatus 14 and into the basin 26. The waste liquid collection trough 116 is attached to the upper carriage 30 and the waste liquid trough is an annular ring on the upper surface of the upper carriage to slightly less than the height of the rotatable carriage as clearly shown in FIGS. 5 and 6. The waste liquid collection trough is spaced a short distance from the rotatable carriage 32 as shown in FIG. 2 in order to not interfere with the carriage.

The dust removal apparatus 40 is mounted with the swinging arm mount assembly 38 and depends from the motor mounts 76 as shown in FIG. 1. The dust removal apparatus has an intake horn 120 connected to a blower 122 with a discharge indicated at 124 to the rear of the saw structure. The blower 122 with a discharge indicated at 124 is to blow dust to the rear of the saw structure. The blower 122 is supported generally below the drive motor 86 and driven by a belt connectable to the drive motor, (not visible in the drawings). Dust from a rock which is being sawed will be pulled into the intake horn 120 by suction from the blower 122 and discharged to the rear of the saw structure via the outlet 124. Use of the dust removal apparatus 40 has been found in practice to be an advantage when cutting softer types of rocks such as flagstone and sandstone because of the large amount of dust created. Generally, use of the dust removal apparatus 40 is not needed when using the cooling apparatus 42. When the cooling apparatus is needed, the blower 122 can be disconnected; and when the blower 122 is needed, it can be connected and the cooling apparatus pump shut off.

Figures 4, 9:
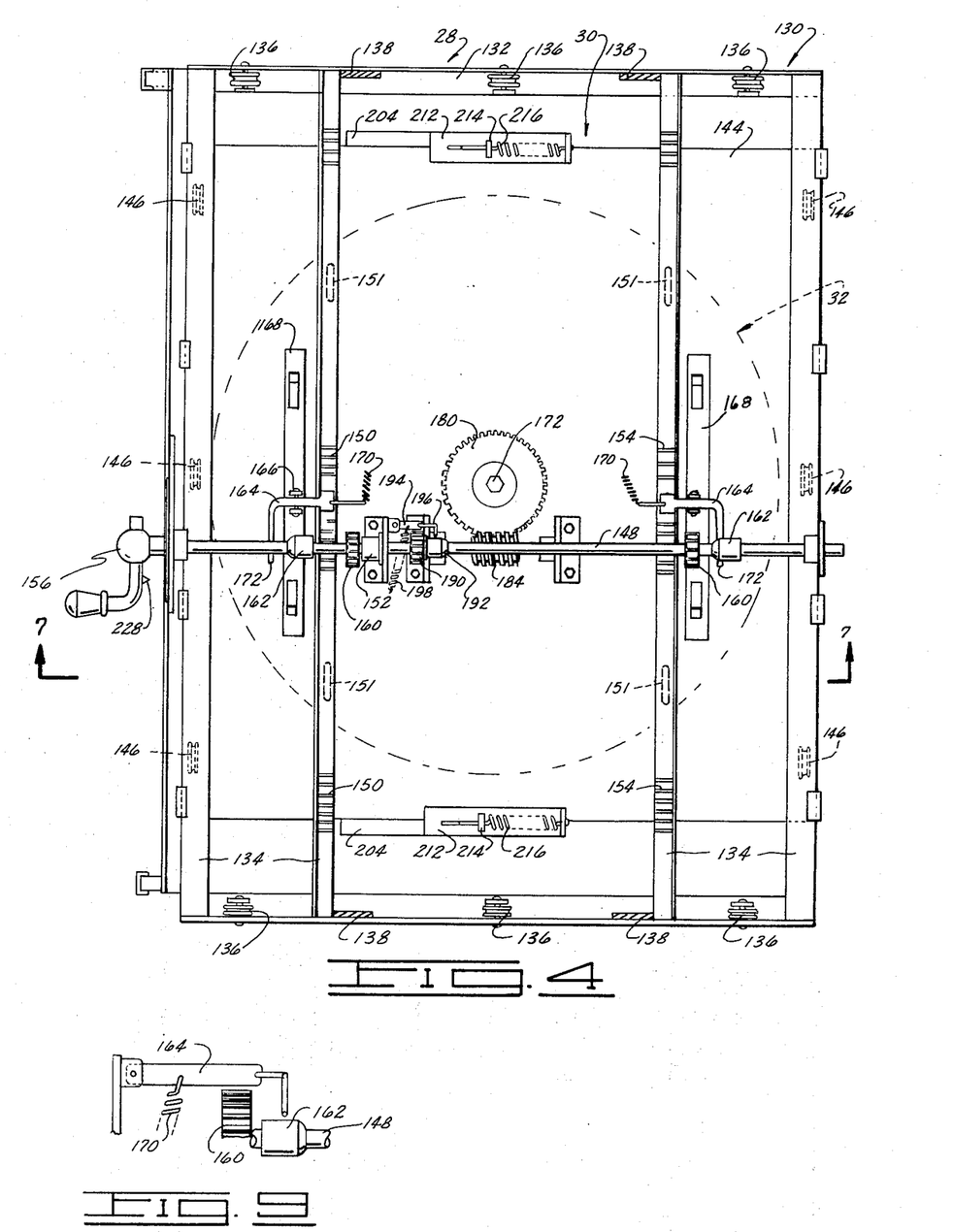
FIG. 4 is a bottom plan view of the carriage apparatus alone, having the work piece carriage shown in dashed lines.
FIG. 9 is an enlarged elevation view of the work piece carriage rotation lock apparatus cut away and removed from FIG. 4.

The carriage apparatus 14 including the lower carriage 28 and the upper carriage 30 and the rotatable carriage or turntable 32 are mounted with rail members 50 of the frame structure 12 so as to be freely and easily moved by hand. Details of the carriages and their relation to the frame can be seen in FIGS. 2, 4, 5 and 6. The lower carriage 28 includes a rectangular frame structure generally indicated at 130 having side members 132 which align with the frame rail members 50 and the transverse members 134 connected between the side members 132. The lower carriage has four transverse members 134 connected between the side members 132; the outer transverse members 134 forming the forward and aft edges of the lower carriage. The lower carriage is supported on the frame rail members 50 by a plurality of rollers, indicated at 136. The lower carriage has six rollers 136 positioned as shown in FIGS. 2 and 4. As can be seen, the rollers 136 have a groove adapted to engage the upper portion of the rail 50. The pair of hold down members 138 are attached to the side 132 adapted to retain the lower carriage 28 in place on the frame rails 50. The hold down members 138 have a plate portion extending downward past the frame rail 50 and an inwardly extending flange passing underneath the frame rail. The lower carriage apparatus 28 is provided with a pair of elongated rack gears on the inner transverse members which are a portion of the precision gear drive apparatus used to move the upper carriage 30 and turntable 32.

Figure 5:
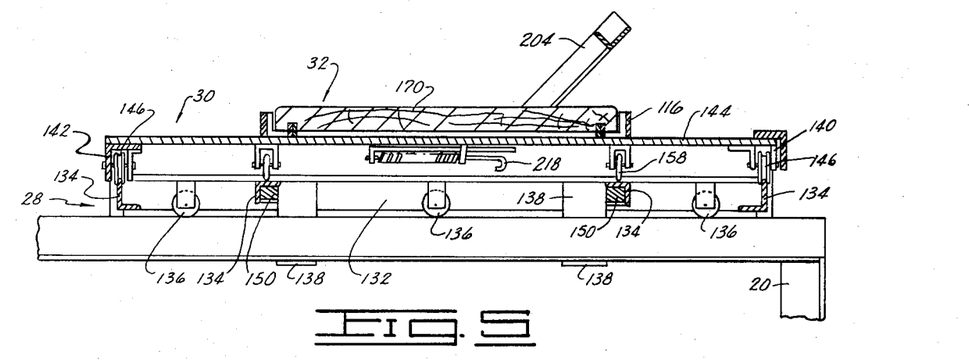
FIG. 5 is a cross sectional view of the entire carriage apparatus taken on line 5—5 of FIG. 2.
Figure 7:
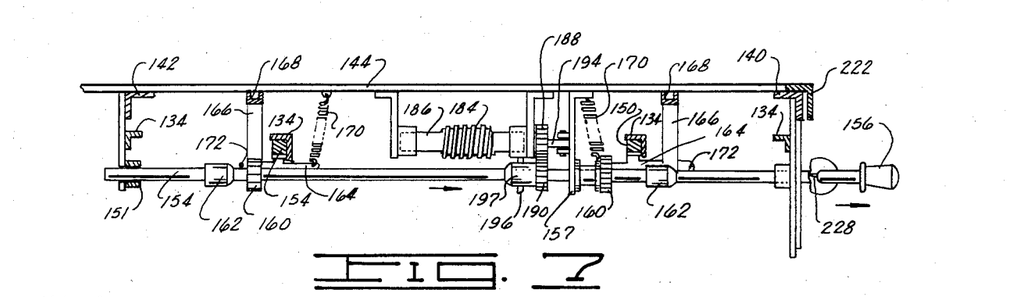
FIG. 7 is a cross sectional view of the upper carriage apparatus alone showing the operating shaft and gearing arrangement, taken on line 7—7 of FIG. 4.

The gear arrangement used to move the carriages is shown generally in FIGS. 4, 6 and 7. The gear drive apparatus includes an operating shaft extending front to back mounted underneath the lower carriage having a rear mount 142, an intermediate mount 144 and a forward mount 146 with a handle 148 on its outer and exposed end. Also, the gear drive apparatus includes a forward rack gear 150 supported below the lower carriage top portion of the transverse inner frame members 134 as can be seen in FIG. 4, FIG. 5 and FIG. 7. The rack gears and the center transverse frame members 134 pass through the upper carriage structure as can be seen in FIG. 7 where the rack gears 150 and 154 are positioned to be engaged by other portions of the gear drive apparatus.

The upper carriage apparatus 30 has the gear drive apparatus mounted with it to move transversely relative to the frame structure 12 and has the turntable 32 mounted in its center portion. The upper carriage 30 has a rectangular frame like structure consisting of forward and aft transverse members. These members are transverse to the saw frame structure 12 and attached to a top member to which a plurality of rollers in the turntable 32 are mounted. The basic structure of the second carriage apparatus is best seen in FIG. 6 and FIG. 7. The forward transverse beam 140 is at the right hand side of FIG. 7 attached to the top member 144 and the rear transverse member 142 is at the left hand side of FIG. 7. These members are also attached to the top member 144. The second carriage is supported above the first carriage by a pair of rollers 146 and is attached to the forward and aft transverse members 140 and 142 the rollers in turn rest on the outer structural members 134 of the lower carriage as easily seen in FIG. 5. Another set of rollers are located in the interior portion of the upper carriage to support the normally heavily weighted center portion of the carriage apparatus; these rollers are mounted on inner transverse members 148 and have rollers 151 positioned to roll on top of the transverse inner members 134 of the lower carriage. The outer transverse sides of the upper carriage 30 do not have edge members because the fence or guide bar used to position and hold a rock in place is mounted with these edges as will be described. As can be seen clearly in FIG. 6 the waste cooling liquid trough 116 is integrally connected with the upper carrige top member 144.

The gear drive apparatus includes an operating shaft 148 mounted with the upper carriage 30 supported at the rear of the carriage by rear mount rollers 151, in the center portion of the carriage by an intermediate mount 152 and at the forward end of the carriage by a front mount 154, and having a handle 156 extending from the forward side of the carriage. The operating shaft 148 is adapted to be rotated as well as moved in and out in order to engage the various parts of the drive apparatus. The translating movement of the upper carriage relative to the lower carriage is accomplished by the operating shaft 148 having a pair of pinion gears 160 secured thereto adapted to be engaged with the rack gears 150 and 154 upon outward movement of the operating shaft. The gear apparatus is best seen in FIGS. 4 and 7 in regard to viewing the same for translating and rotating motions of the carriages. The gearing apparatus as shown in FIG. 4 and FIG. 7 is in a position not engaged for movement of the upper carriage transversely relative to the lower carriage. Movement of the operating shaft 148 is as indicated by the arrow adjacent to the handle 156. Movement of the operating shaft 148 will engage the pinion gears 160 with the rack gears 150 and 154 thereby allowing rotational movement of the operating shaft to shift position of the upper carriage relative to the lower carriage.

Figure 8:
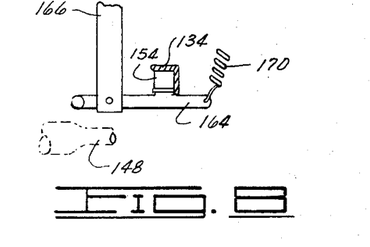
FIG. 8 is an enlarged side elevation view of the transverse motion carriage lock apparatus cut away and removed from FIG. 7.

A locking mechanism is provided at each of the rack gears adjacent to the operating shaft. The locking mechanism consists of a cam member 162 rigidly secured to the operating shaft 148 adjacent to the pinion gears 160 and a pivoted paw member 164 engagable with the respective rack gears to lock their relative position of the rack gear and the upper carriage. The pivotal paw member 164 is supported on an upright brace 166 attached to mount 168 on the upper carriage top 144. The paw has a spring 170 on the inner side of the rack gears and on one side of the pivot point, and has a rubbing block member 172 on the opposite end of the paw 164 and on the opposite side of the pivot point. As the operating shaft is pulled from the position shown in the drawings the rubbing block 172 moves onto the raised surface of the cams 162 thereby moving the paw 164 from the rack gears 150 and 152 simultaneously with the engagement of the pinion gear 160 into the rack gears. The operating handle 156 is rotated with pinion gears moving along the rack gears thereby translating the position of the upper carriage 30 relative to the lower carriage 28. When movement of the carriage is no longer desired the handle is pushed inwardly therby pulling the pinion 160 from the rack gears 150 and 154 and at the same time moving the rubbing blocks 172 off of the cams 162, thus engaging the paws 164 with the rack gears and locking the relative positions of the carriages. It is to be noted the two lock devices are used and one is offset from the other thereby locking the carriages in any position.

The work piece carriage apparatus 32 has a turntable surface 170 secured to a shaft 172, mounted in a spindle socket 174 that is attached to the top 144 of the upper carriage 30. The shaft 172 extends vertically downward through the spindle socket 174 and is supported by bearings 176 on its upper portion and bearings 178 on its lower end. A circular gear 180 is attached to the shaft 172 to rotate with the turntable surface 170. The outer peripheral portion of the turntable carriage 32 is supported by a large circular bearing 184 between that portion of the turntable 170 and the top of the upper carriage 30. A water seal 182 is provided around the bearing 184 in order to prevent waste cooling liquid from passing underneath the turntable and into the bearings. Rotation of the work piece carriage 32 is accomplished by the use of a worm gear 184 mounted on a shaft 186 and connectible by small circular gears 188 and 190 on an intermediate shaft to the opening shaft 148 operable when the operating shaft is in the inward position and not engaged to move the upper carriage 30. A locking mechanism is provided similar to the one previously described having a cam 192 secured to the operating shaft 148 adapted to move a paw 194 having a rubbing block 196 and spring 198. As the gearing apparatus is shown in FIG. 4 and FIG. 7 the gears are engaged so as to provide for rotation of the turntable 170 by twisting the handle 156. As the handle 156 is moved outward as indicated by the arrow adjacent to the handle the rubbing block 196 moves off of the cam 192 thereby engaging the paw 194 with the circular gear and locking rotation of the work piece carriage 32.

The rock saw 10 has a work piece fence structure, generally indicated at 200, extending across the upper carriage 30 to provide a back stop and rock holding device. The fence structure 200 is best seen in FIGS. 1, 2, 3 and 6, for purposes of description. The fence includes a cross bar 202 with upright cross bar end 204 supporting the structure above a fence lock device indicated at 206, one of which is positioned on opposite sides of the upper carriage top 144. The fence lock device engages with the upper carriage top member 144 in a locking action in order to hold the fence structure 200 in place, and allow for moving it as desired. The cross bar ends and locking apparatus is best viewed in FIG. 3. The cross bar ends 204 join an upper plate member on the lock which rests on the upper edge portion of the top 144, a spacer member 110 is adjacent to the end of the top 144 and a lower plate member 112 is below the edge portion of the top 144. A clip member 214 passes over the upper and lower plate members 208 and 212 and has a notch to engage the top 144, the clip is held into the locked position by a spring 216 connected between one end of the clip and the lower plate member 212. The spring 216 turns the clip 214 so it clamps the top 144 between the upper and lower plates 208 and 212. To release the lock the spring 216 is pulled by the hook, indicated at 218, in order to release the clamping action and allow for movement of the fence structure 200 along the top. The spacer 210 maintains the upper plate 208 in a nearly parallel relation with the lower plate 212 and the upper carriage top 144. A fence lock 206 is provided on each end of the cross bar 202 so as to rigidly hold the cross bar in a fixed position above the upper carriage 30. The fence structure 200 can be removed from the upper carriage 30 by releasing the fence locks 202 and moving the fence structure completely off the upper carriage top 144.

Precise movements of the carriage apparatus and swinging arm apparatus 34 for the rock saw 10 are accomplished by the use of dial indicating devices in order to provide precise angular measurements and precise distance measurements cut with the saw. As previously described the swinging arm mount structure 38 has a dial 78 on the fixed plate portion thereof 68 as shown in FIG. 10 which aligns with an indicating mark 80 on the rotatable plate portion 70. Preferably this dial indicator measures rotation of swinging arm apparatus 34 in degrees from the vertical. The structure shown in FIG. 10 is positioned so that the cutting blade is in the vertical position relative to the surface of the turntable like carriage 32. As shown, the dial indicator 78 will measure angles up to 45°. Due to structural limitations of the herein depicted and described motor mount 76 the swinging arm apparatus 34 cannot be rotated past the 45° limit. Practice has shown that 45° is a sufficient operating range to accomplish most desired stone cuts. The indicated dial 78 is preferably calibrated in single degree graduations and larger 5° graduations. It is to be noted that additional rotation of the swinging arm apparatus can be obtained from a mount structure similar to that shown in the drawing by modification of the motor mounting portion of the structure s0 that a greater angle of rotation is allowed. In regard to translating motion of the upper carriage apparatus 30 relative to the frame structure 12 and lower carriage 28 a ruler-like indicator 220 supported on a transverse indicator bar 122 mounted with the end members 132 of the lower carriage apparatus 28, the indicator 220 is adapted to align with an indicating mark 224 on the upper carriage top 144. As the upper carriage 30 is moved back and forth the indicator mark 224 can be used with the linear indicator 220 to determine the transverse position of the upper carriage relative to the lower carriage. Since the indicator bar 122 stays in a fixed position on the lower carriage 28 the linear indicator 220 provides a stable and fixed means of measuring movement of the upper carriage. In practice an ordinary inch measuring scale has been found practical and advantageous on the linear indicator 220. In regard to rotational measurement of the work piece carriage 32 a circular indicator dial 226 is provided behind the handle 156 on the forward portion of the carriage apparatus. The indicator dial 226 is supported from the structure of the upper carriage 30 and moves with the carriage as the handle and operating shafts do. The indicator dial 226 is preferably scaled in degrees corresponding to similar degree rotation of the turntable 170. A point 228 attached to the handle 156 is used to indicate the exact position of the turntable 170. Calibration of the dial indicator 226 in degrees has been found in practice to be an advantage when cutting shaped stones such as letters, stars, etc.

The rock saw 10 is constructed so that it can be operated by one person in the cutting of rocks, stones, tile and the like. The carriage apparatus 14 can be easily moved forward and rearward by hand force even when a large rock is placed on it for cutting; also the carriage apparatus 14 can be rotated and translated easily through use of the gear drive apparatus operated by the hand rotatable handle 156. Movement of the cutting blade apparatus 16 up and down is accomplished either through the use of the foot actuated lever 54 of the handle 110. The advantage to the foot operated lever is that a person's hands are left free to move the carriage or position and hold the rock in position while the cutting blade can be moved vertically with the use of one foot, thereby enabling one person to use the saw. Angular rotation of the swinging arm apparatus 34 must be done while the machine is stopped, and there again requires no more than one person to adjust since the structure and adjustment is relatively simple. Use of the blade cooling system does not interfere with other manual operations of the saw since the coolant liquid is circulated over the blade and through the basin and pump without requiring the attention of an operator once it is adjusted. Similarly use of the dust removal apparatus 40 requires no attention of the operator once set in motion.

In the manufacture of the rock saw structure of this invention it is obvious that the saw is constructed having all of the necessary and properly coordinated components to achieve the end product. The structure of the table-frame structure and carriage apparatus 14 is sufficiently strong to enable the rock saw to be used with large stones, tiles, and the like, and operated by one person. The cutting blade apparatus 16 is provided with a cutting blade 36 and means to power same and is adapted to be easily raised and lowered by hand or foot motion when in operation and turned angularly to make angular cuts. Additionally, the rock saw structure 10 is provided with a blade cooling apparatus 42 to pass liquid over the cutting blade and a dust removal apparatus 40 to remove dust from the cutting area.

In the use and operation of the rock saw structure of this invention, it is seen that same provides a saw adapted to cut stones, rocks, tile and the like and has the capability to cut same in a precise manner by use of the rotational and translational features of the carriage apparatus and the cutting blade apparatus 16. The saw provides a means of accurately cutting stones to desired sizes and shapes. The rock saw structure is adapted for the use by one person to cut rocks and the like to desired sizes and shapes relatively easily. The rock saw has a cooling apparatus usable when cutting hard materials to extend the life of the blade and lessen the danger of blade failure due to overheating as well as reducing the amount of dust produced. Also the rock saw structure has a dust removal apparatus 40 adapted for use in cutting softer rocks and the like to remove the cutting dust from the immediate area and direct it away from the saw structure and the operator.

As will become apparent from the foregoing description of the deceased applicant's rock saw structure, relatively simple means has been provided for the accurate cutting of rocks, stones, tiles and the like. The rock saw structure is simple to use, operable by one person, simple in mechanical structure and can be easily manufactured. The rock saw structure is adapted for easy use by one person and can be used to cut rocks to desired shapes through manipulation of the carriage and cutting blade apparatuses.

While the invention has been described in conjunction with preferred specific embodiments thereof, it will be understood that this description has intended to illustrate and not to limit the scope of the invention, which is defined by the following claims.

I claim:
1. A saw means comprising:
a. frame means having a pair of elongated rail members,
b. rotary blade means mounted with said frame means,
c. means operably connected to said rotary blade means and said frame means to change the angular position of said rotary blade means relative said frame means,
d. said rotary blade means having a blade support arm member pivotally mounted with said means to change the angular position of same and having a rotatable blade mounted at the outer end thereof, said arm member being adapted to raise and lower said rotatable blade and said arm being adapted to be angularly rotated by said means to change the angular position of said rotatable blade,
e. said means to change the angular position of said rotary blade means having a fixed portion secured to said frame means and a movable portion rotatably secured to said fixed portion, and said movable portion having said blade support arm member pivotally mounted therewith so as to freely pivot and angularly rotate therewith,
f. table means to receive a work piece and mounted on said frame means and having means to translate same longitudinally relative said rotary blade means, means to translate same transverse relative said rotary blade means, and means to rotate the work piece relative to said rotary blade means,
g. said table means having a lower carriage means mounted on said pair of elongated rail members so as to be freely and easily movable thereon to move longitudinally relative thereto and move to and from said rotary blade means, said lower carriage means having a rail means thereon, and an upper carriage means mounted on said rail means on said lower carriage means, said upper carriage means being movable thereon and having means to move same accurately relative said lower carriage means, and a turntable work piece carriage means rotatably mounted in a generally horizontal plane on said upper carriage means and having means to accurately rotate said turntable relative said upper carriage means,
h. a generally vertically positioned shaft rotatably mounted on said upper carriage means, said turntable mounted on an end portion of said shaft, and gearing mounted on said shaft and connected to said means to rotate said turntable, and
i. said means to move said upper carriage relative to said lower carriage accurately having means to translate said upper carriage with means secured to said lower carriage and means on shaft means mounted on said upper carriage, and having means to engage and disengage same, and last-named means having means being lockable when not engaged for movement.

2. The saw means of claim 1, wherein:
a. said means to rotate said work piece turntable carriage means has an intermediate shaft supporting said gearing and having intermediate gearing engagable with other gearing mounted on said shaft means,
b. said shaft means is rotatable and axially movable and has attached gearing positioned axially thereon so that only said other gearing and said attached gearing one at a time is engagable with the respectively mated gear, and
c. said means being lockable has a locking arm engagable with a gear on said upper carriage means and another locking arm engagable with said intermediate gearing when said first-named gearing is not engaged for rotation, said shaft means has a pair of wedges spaced thereon adapted to raise said locking arms from said gearing as said shaft means is moved before the respective gearings are engaged for operation, said wedges are adapted to replace said locking arms and said respective gearings when said shaft means is moved so as to disengage said respective gearings.

3. The saw means of claim 2, wherein:
a. said shaft means has operating means and indicating means thereon adapted to be used with rotating and translating movement of said rotatable carriage means and said upper carriage means, and
b. said upper carriage means has measuring indicia thereon adapted to be used to determine the relative position of said upper carriage means and said lower carriage means.

4. The saw means of claim 3, wherein:
a. said saw means has a blade cooling means adapted to in operation pass a cooling liquid onto said rotatable blade, and
b. said saw means has a dust removal means adapted to in operation remove dust from the area of said rotary blade means.

5. The saw means of claim 4, wherein:
a. said blade cooling means has a basin means mounted with said table means below said lower carriage means, a pump means connected to said basin means by a drain conduit means, an outlet conduit means connected to said pump means and having the outlet thereof positioned so as to in operation direct cooling liquid onto said rotatable blade, said blade cooling means is in operation adapted to recirculate cooling liquid passing same over said rotatable blade, and b. said dust removal means has a fan means having an inlet and an outlet mounted with said frame means, and an enlarged inlet means positioned to receive dust material from said rotatable blade and connected to said fan means intake, said dust removal means in operation is adapted to receive dust and material from said rotatable blade in said enlarged inlet means, pass same through said fan means and discharge same via said fan outlet away from said saw means.

* * * * *